Sept. 23, 1924.　　　　　J. TALALAY　　　　　1,509,380
VULCANIZING KETTLE
Filed May 10, 1924　　　2 Sheets-Sheet 1
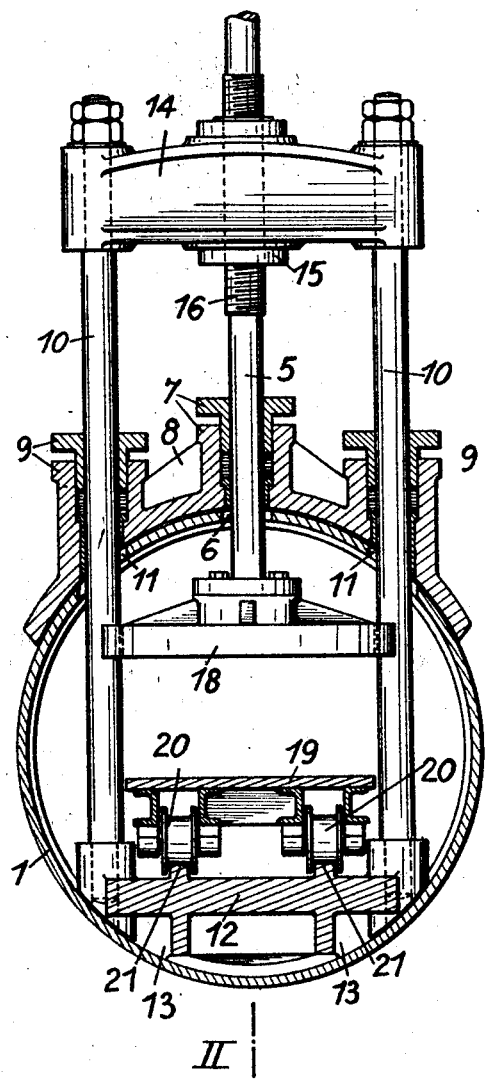
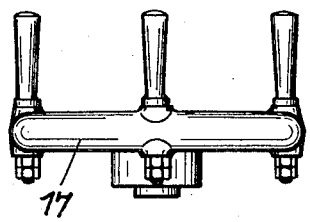
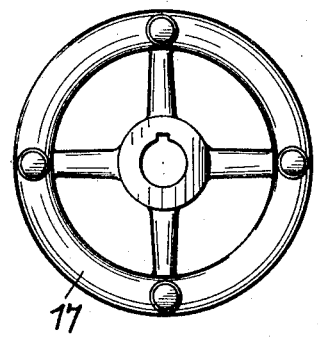
Inventor
J. Talalay
By Marks & Clerk
Attys.

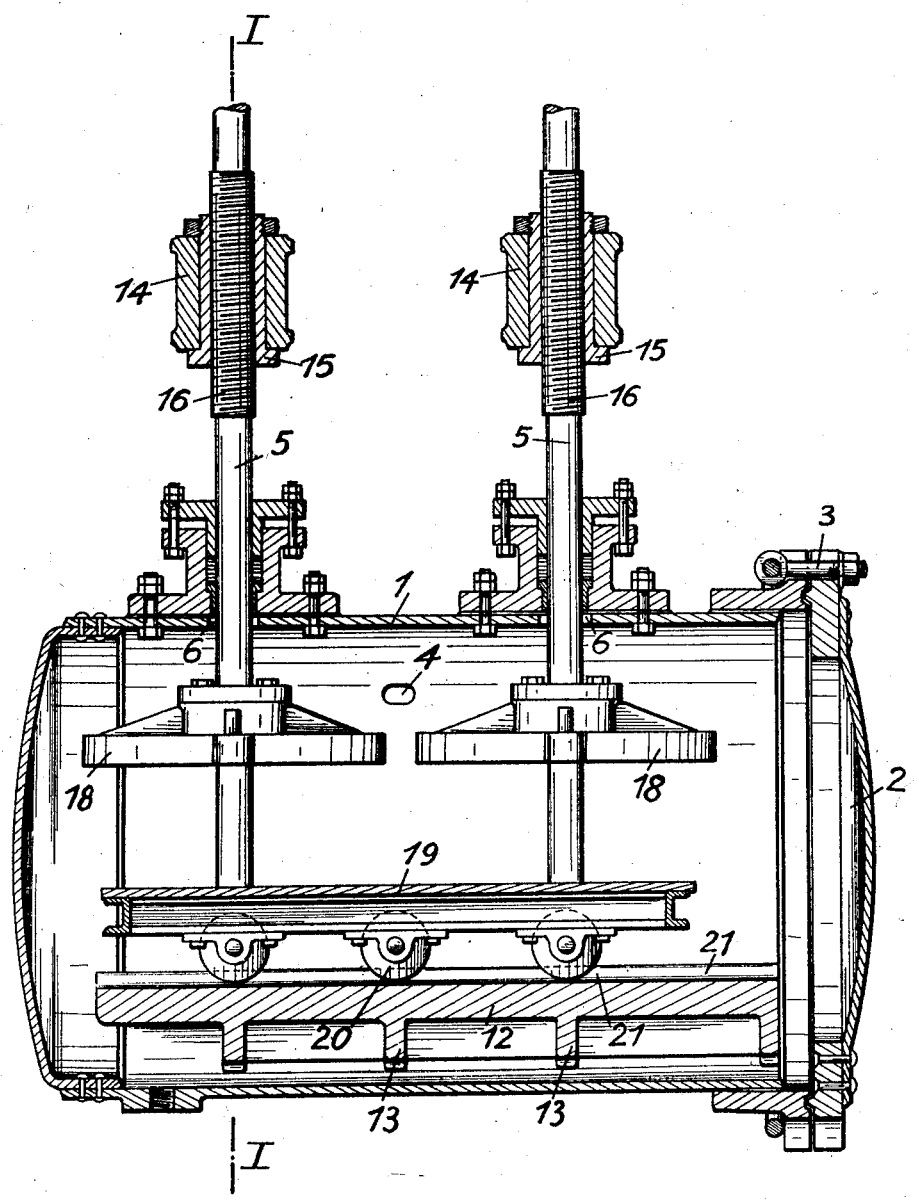

Patented Sept. 23, 1924.

1,509,380

UNITED STATES PATENT OFFICE.

JOSEF TALALAY, OF BERLIN, GERMANY.

VULCANIZING KETTLE.

Application filed May 10, 1924. Serial No. 712,428.

*To all whom it may concern:*

Be it known that I, JOSEF TALALAY, a citizen of Lithuania, residing in the city of Berlin, Germany, have invented certain new and useful Improvements in Vulcanizing Kettles, of which the following is a specification.

This invention relates to kettles for vulcanizing presses for the vulcanization of rubber goods and the like in closed moulds, and among other objects and advantages my invention is particularly intended to improve and facilitate the manipulation of presses of the kind referred to and to devise means for increasing the output thereof and the ease and velocity of operation, while at the same time turning out a superior kind of goods. The vulcanization of rubber goods in moulds, as originally practised, was effected by securing the two sectioned moulds, after charging them with the goods, separately in frames in which they were tightly pressed together by screw or wedge action or the like in such a manner that they were prevented from being forced apart and be burst by the interior pressure resulting from the expansion of the charged material by the heat of the vulcanization process, and in consequence of the ensuing liberation of gases. This method, however, necessitated a considerable expenditure of work and time, so that it is not suitable for use for the manufacture of mass articles. In view thereof, attempts have also been made to compress a plurality of moulds at one time and in the vulcanizing kettle itself by mounting the moulds upon a table directly supported upon the bottom of the kettle, and by submitting them to the pressure of a common pressing plate which is actuated in its course by a pressure rod entering the kettle from without. Inasmuch, however, as in the method referred to the entire compressing pressure has to be borne directly by the walls of the kettle a great strain is exerted upon such walls, so that, in order to avoid rupture and tearing of the kettle walls, they should either be made of very great thickness or only the highest grade of material could be used in its manufacture. Besides, with this method the size of the kettle must be comparatively small, so that it is only adapted for the reception of a single press, and can only be used for the vulcanization of comparatively small articles.

According to my invention means are provided for overcoming the drawbacks referred to of the previous art of vulcanization in an absolutely reliable manner, and to provide a vulcanization kettle press in which the kettle may be made of cast-iron as usually, but may be of any size desired, without any danger of straining it beyond the admissible limit by the pressure prevailing during compression and in the vulcanization process. This object is accomplished in accordance with my invention by providing means for relieving the walls of the vulcanization kettle from the strains occurring in the compression of the mould and during vulcanization. The complete relieving from strain of the kettle wall is effected by suspending the pressing table for the mounting of the moulds at the lower extremities of two or more draw bars or the like which pass with free movement through the upper portion of the vulcanization kettle and are connected at their upper extremities by a beam, bar or the like which serves at the same time as a bearing for the threaded pressure rod, and is adapted to absorb both the counter pressure of the rod as well as the compression pressure exerted upon the compression table. In view of this arrangement the kettle wall should only be strong enough to support at most the own weight of the completely charged press which is so small however comparatively speaking that it may safely be neglected in the calculation of the strength of the kettle walls in ordinary cases. In view of the fact that there is no further limitation in the selection of the size of the kettle, because its walls are relieved from the strain, the kettle may be made of such length that a plurality of presses may be mounted in a common vulcanizing kettle in succession which may be preferably connected with a sliding platform adapted to move upon rails of the pressure table proper, in order to facilitate the introduction of the closed moulds into the vulcanization kettle and the mounting thereof in the press as much as possible.

The invention will be more fully described with reference to the accompanying drawing, showing by way of example a form of embodiment of the principles of the invention in a combined vulcanization press and kettle in Figure 1 in vertical cross section, and in Figure 2 in longitudinal section. Figure 3 is a side view, and Figure 4 is a top plan view of the hand wheel for the operation of the press.

In the drawings, the vulcanization kettle proper is indicated at 1; it is closed at its extremity by a cover 2 which is adapted to be forced in the usual manner upon the kettle opening by means of swinging bolts 3. The vulcanization kettle 1 consists preferably of wrought iron. In the form of construction shown as an exemplification in the drawing the vulcanization press may be operated by two rods 5 each of which passes into the interior of the kettle through an aperture 6 provided at the highest point of the kettle. The rod 5 is tightened by a stuffing box 7 mounted in the center of a sector shaped or saddle shaped collar or seating member 8 which may also be provided on either side of the stuffing box 7 with an additional guiding collar 9 for the reception of stuffing boxes in substantial parallelism to the stuffing box 7, and serving for the tightening of draw bars 10 each which pass through openings 11 into the interior of the vulcanization kettle 1. At the lower extremities of all the draw bars 10 the pressure table 12 is secured which is adapted to rest upon some points of the kettle bottom by means of substantially rib-like feet 13, while remaining movable independently thereof. The upper ends of each two draw bars 10 of each press are rigidly connected to each other by a beam, web or the like 14, so that the pressure table 12, the draw bars 10 and the beam 14 constitute together a rigid frame which is freely supported upon the kettle bottom. In the center of the beam 14 is interiorly threaded or provided with a threaded sleeve 15 serving for the journaling of the threaded part 16 of the pressure rod 5. The rotation of the rod 5 is effected by a hand wheel 17 of any suitable construction.

To the lower end of each of the threaded rods 5 the press plate 18 is swiveled by means of a suspension joint, hanger or the like and in a such manner that the plate is free to slide along the draw bars 10 by means of lateral oppositely arranged recesses, so as to be secured against rotation. It therefore appears that the moulds inserted into the press can only be strained in the axial direction upon the rotation of the pressing rod, while, on the other hand, in the case of the employment of a pressing plate unsecured from rotation tilting of the moulds is liable to occur.

With a view of facilitating the insertion and adjustment and reducing the time of manipulation of the moulds in the presses, particularly in the case of the arrangement of several presses in a single vulcanizing kettle, as provided in accordance with my invention, the possibilities afforded by my invention, the pressing table 12 proper may be provided with a sliding platform 19 adapted to be moved on the guide rails 21 of the press table 12 by means of sliding rollers 20. The charged moulds may therefore be mounted upon this sliding platform outside of the vulcanization kettle 1; they are then pushed into the kettle, and are conducted below the corresponding pressing plate 18. By the arrangement of a pluarlity of presses in the interior of a single vulcanization kettle the additional advantage is obtained that moulds of different height may be used and placed under pressure within one and the same kettle, which, of course, is not possible with but one press.

While with the kettle presses heretofore known the entire working pressure had to be borne by the walls of the kettle, the walls of the kettle with the kettle press according to this invention are entirely relieved from the pressure occurring upon the compression of the moulds and during vulcanization, inasmuch as the compressing pressure acting upon the press table as well as the counter pressure of the press rod or spindle 5 are borne exclusively by the beam or web 14 which, of course, should be properly dimensioned for this purpose. The kettle bottom is merely required to support the weight of the press itself, that is to say, the weight of the frame formed by the press table 12, the draw bars 10 and the beam 14 and the weight of the press spindles 5; this weight however, comparatively speaking is so low as to be perfectly negligible for all practical purposes.

It should be understood that the invention is not restricted to the particular means and arrangement of parts herein shown and described by way of exemplification of the principles thereof, but it is susceptible of changes and modifications, as will suggest themselves to the operator in the ordinary use of the invention, and without deviating from the spirit thereof, as pointed out in the claim hereunto appended.

I claim:—

In a device of the kind described, a vulcanizing kettle, detachable closing means for the kettle, a press table within the kettle, rib-like feet integral with the under surface of the table and resting upon the interior of the base of the kettle, integral tracks on the upper surface of the table parallel with the guide edges thereof, a rolling platform mounted upon the tracks, substantially parallel spaced draw bars secured to the table and gas-tightly guided in the kettle walls, a connecting member secured to the draw bars outside of the kettle, adjustable operating means guided in said connecting members and gas-tightly passing through the kettle walls into the interior thereof, and a compressing member swivelly connected to the operating means in the interior of the kettle and guided in the draw bars.

In testimony whereof I have signed my name to this specification.

JOSEF TALALAY.